(12) United States Patent
Schnell

(10) Patent No.: US 6,415,521 B1
(45) Date of Patent: Jul. 9, 2002

(54) FISH MEASURING APPARATUS

(76) Inventor: Tim Schnell, 3708 Cobblestone Ct., Bedford, TX (US) 76021

( * ) Notice: Subject to any disclaimer, the term of this patent is extended or adjusted under 35 U.S.C. 154(b) by 0 days.

(21) Appl. No.: 09/286,164

(22) Filed: Apr. 5, 1999

(51) Int. Cl.[7] .................. G01B 3/06; A01K 97/00
(52) U.S. Cl. .................. 33/511; 33/485; 33/549
(58) Field of Search .................. 33/483, 484, 485, 33/489, 494, 758, 759, 760, 511, 549, 348; 362/33, 97–99

(56) References Cited

U.S. PATENT DOCUMENTS

| | | | | | |
|---|---|---|---|---|---|
| 1,474,804 A | * | 11/1923 | Tyrrell | ............ | 33/511 |
| 2,354,853 A | * | 8/1944 | Dobbs | ............ | 33/760 |
| 2,992,487 A | * | 7/1961 | Miller | ............ | 33/760 |
| 3,259,988 A | * | 7/1966 | Lunn | ............ | 33/511 |
| 3,875,396 A | * | 4/1975 | Webb | ............ | 362/98 |
| 4,566,721 A | * | 1/1986 | Friedman et al. | ............ | 281/31 |
| 4,580,352 A | * | 4/1986 | Wilson | ............ | 33/563 |
| 4,665,620 A | * | 5/1987 | Osteen | ............ | 33/760 |
| 5,097,617 A | | 3/1992 | Craven | ............ | 43/4 |
| 5,148,607 A | * | 9/1992 | Lasiter | ............ | 33/485 |
| 5,163,748 A | * | 11/1992 | Messinger | ............ | 362/98 |
| 5,228,226 A | | 7/1993 | Porosky | ............ | 43/5 |
| 5,339,532 A | * | 8/1994 | O'Keefe | ............ | 33/485 |
| 5,361,504 A | * | 11/1994 | Huang | ............ | 33/DIG. 1 |
| 5,502,623 A | * | 3/1996 | Brotz | ............ | 362/99 |
| 5,519,592 A | * | 5/1996 | Helms | ............ | 33/511 |
| 5,526,575 A | | 6/1996 | Hoover et al. | ............ | 33/485 |
| 5,637,838 A | * | 6/1997 | Arey et al. | ............ | 33/484 |
| 6,073,359 A | * | 6/2000 | Lee | ............ | 33/483 |
| 6,115,932 A | * | 9/2000 | Fedora | ............ | 33/758 |

FOREIGN PATENT DOCUMENTS

FR 2706031 * 12/1994 .................. 33/758

* cited by examiner

Primary Examiner—Christopher W. Fulton
(74) Attorney, Agent, or Firm—Schwegman, Lundberg, Woessner & Kluth, P.A.

(57) ABSTRACT

A fish board has a platform having a measuring surface and a light that can illuminate the surface. The light is positioned so that the user can see the measuring scale in low light conditions. The power source for the light source is integrated into the design of the apparatus. The apparatus also includes holders or grippers attached to the platform, and an attached fish-holding clip.

12 Claims, 3 Drawing Sheets

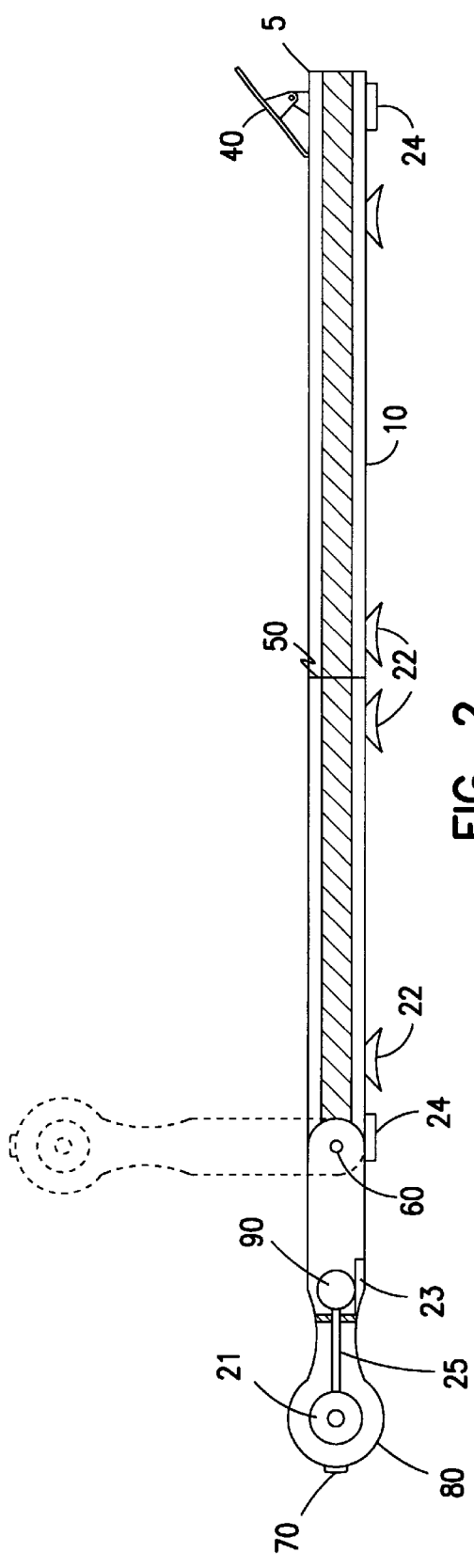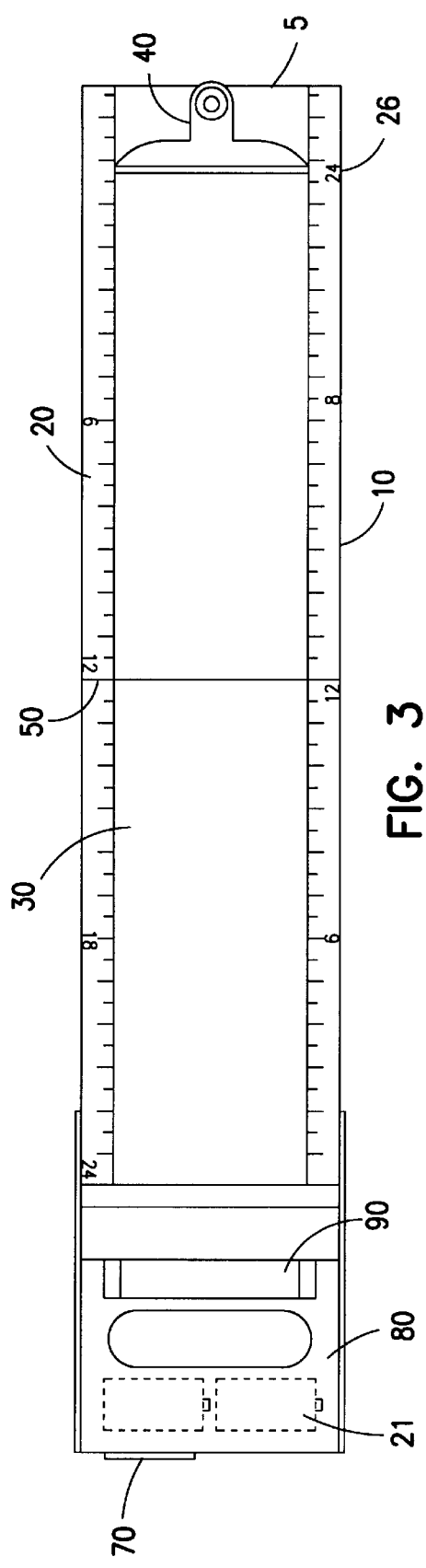

FISH MEASURING APPARATUS

FIELD OF INVENTION

The present invention relates generally to fishing tackle equipment, and more specifically to an apparatus for measuring and cutting fish.

BACKGROUND

Fishing enthusiasts use a variety of equipment to help them enjoy their sport. At various times anglers need to use different devices to measure fish, or to fillet or cut fish. Also, since they usually carry their equipment, anglers have a need for compact equipment that can perform a variety of these functions.

Measuring fish immediately after they are caught is especially important because most states have strict conservation laws, and fishermen who keep fish under a certain length limit may be subject to a heavy fine. Anglers who fish in icehouses, or at dusk or dawn, also need a convenient light source to help them measure the fish when the task becomes difficult because of the low light conditions.

There are many devices which allow an angler to measure a fish. However, if the angler is in dim light, they must try to hold the fish, the fish measuring device, and a flashlight all at once while attempting to measure the fish. Since the fish is alive throughout the process, it is also fighting and squirming. The task is neither easy nor pleasant. Thus, a device which permits an angler to quickly and conveniently measure a fish in low light conditions is needed.

SUMMARY OF INVENTION

The present invention provides a fisherman with a multi-purpose, lighted fish board to use for measuring fish. The fish board includes a platform on which to measure the fish, a length measuring scale attached directly to the platform, and a built-in light source attached to the platform so that the light illuminates the platform, allowing the fisherman to measure the fish in low-light conditions. The attached light also allows the angler to fillet, scale, or cut the fish in low light conditions.

In further embodiments, the fish board includes a gripper or clip attached to the platform to hold the fish while it is being measured or cut, and holders, such as suction cups, attached to the bottom of the device to allow the apparatus to be removably mounted to a boat seat, dock, or other surface.

In another embodiment, the fish board includes a hinged, two-piece platform so that the user can fold the platform for easier carrying and storage, and also allows it to be used as a portable flashlight.

In a further embodiment, the fish board platform is made from a non-opaque material. The light source is attached to a housing beneath the platform. When the light is activated, the light passes through the non-opaque platform to illuminate the measuring scale and the surface of the platform itself.

BRIEF DESCRIPTION OF THE DRAWINGS

FIG. 2 is a side view of FIG. 1.

FIG. 3 is a top view of FIG. 1.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined or that other embodiments may be utilized and that structural changes may be made without departing from the spirit and scope of the present invention. The following detailed description is, therefore, not to be taken in a limiting sense, and the scope of the resent invention is defined by the appended claims and their equivalents.

Figure 1:
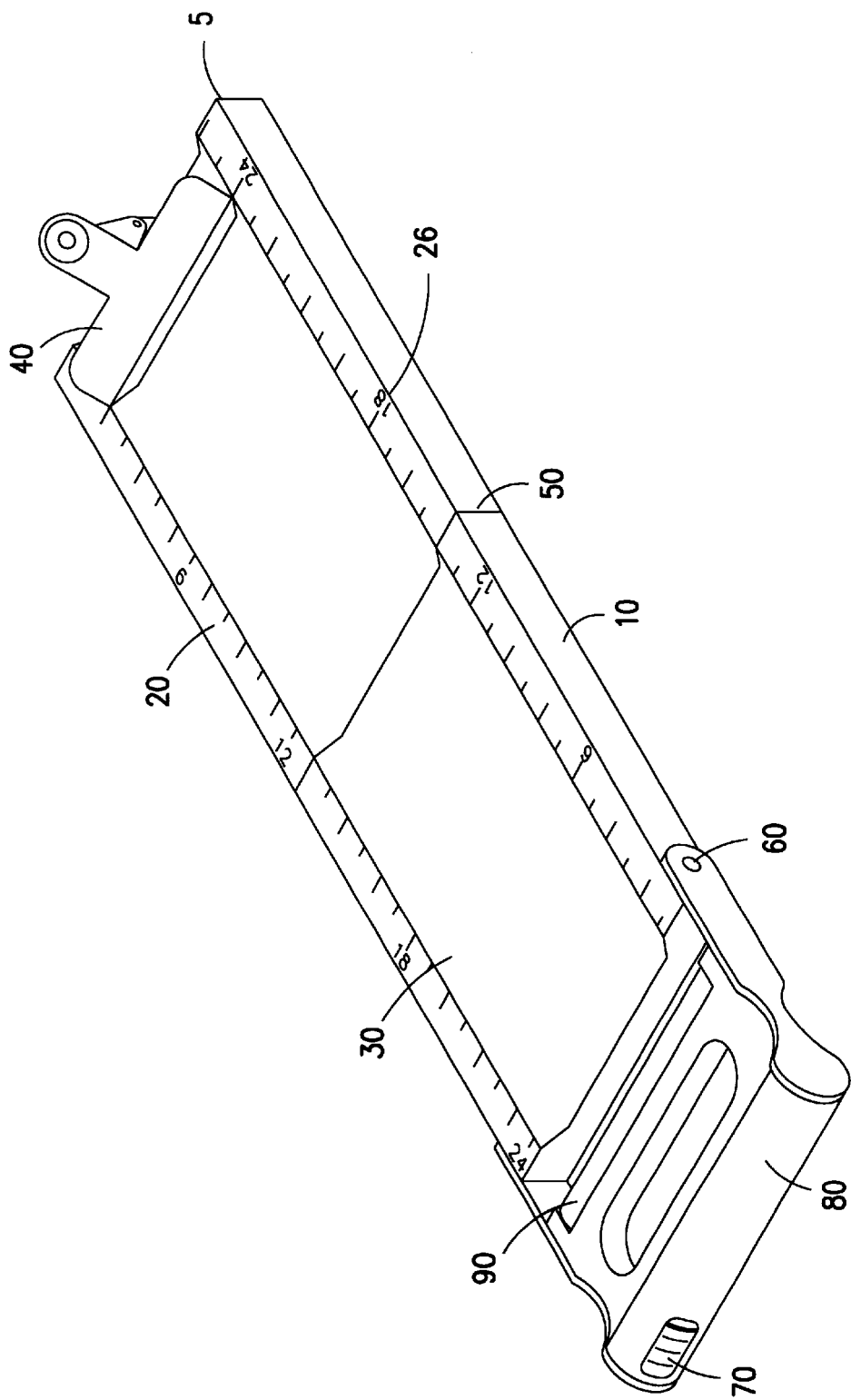
FIG. 1 is a view of one embodiment of a fish board according to the invention.

FIGS. 1, 2, and 3 show one embodiment of a fish board 5 according to the invention. Fish board 5 has a platform 10, a length measuring scale 20, a gripper such as clip 40, a light source 90, a switch 70, and a handle 80. When light is needed, the user activates switch 70 to turn on light source 90. Light source 90 can be adjusted so that measuring scale 20 and platform 10 are illuminated. The user then places a fish on platform 10, using clip 40 to hold the fish. The user may then measure, fillet, cut, or scale the fish. Length measuring scale 20 includes indicia 26 to enable the user to accurately measure the fish.

Platform 10 has dished surface 30 running laterally down its length. Dished surface 30 helps to hold the fish in place while it is being measured or filleted. It also drains off water so that the water goes off the ends of platform 10 and not onto the user. Platform 10 also has a hinge 50. Hinge 50 allows platform 10 to be folded in half for easy transport and storage.

FIG. 2 also shows holders 22 attached to bottom of platform 10 to allow the user to removably mount platform 10 to a boat seat or a dock. Holders 22 are any removably mountable devices, such as suction cups or removable clamps. Holders 22 are attached to the bottom of platform 10 in a staggered pattern so that when platform 10 is folded shut, holders 22 do not contact one another or stick together, allowing the board to be folded tightly shut. Platform 10 also has fasteners 24, such as magnets or hook fasteners, which hold platform 10 shut when it is folded.

Hinge screw 60 attaches handle 80 to platform 10, allowing handle 80 to be rotated upwards to provide a higher level of illumination to platform 10. Handle 80 is used to carry fish board 5. This allows fish board 5 to be utilized as a portable flashlight as well.

Handle 80 contains power source 21. Power source 21 is any set of batteries capable of providing power to light source 90, such as two D size batteries. FIGS. 2 and 3 show how power source 21 is electrically connected by wires 25 to light source 90. Light source 90 is a fluorescent, cylindrical-shaped lightbulb incorporated into handle 80. Light source 90 also includes an AC converter to allow the fluorescent light to run off of DC power. Those skilled in the art will recognize that any smaller sized light source could also provide the proper amount of light. Having power source 21 and light source 24 attached within handle 80 enables fish board 5 to have a low, compact profile.

Figure 4:
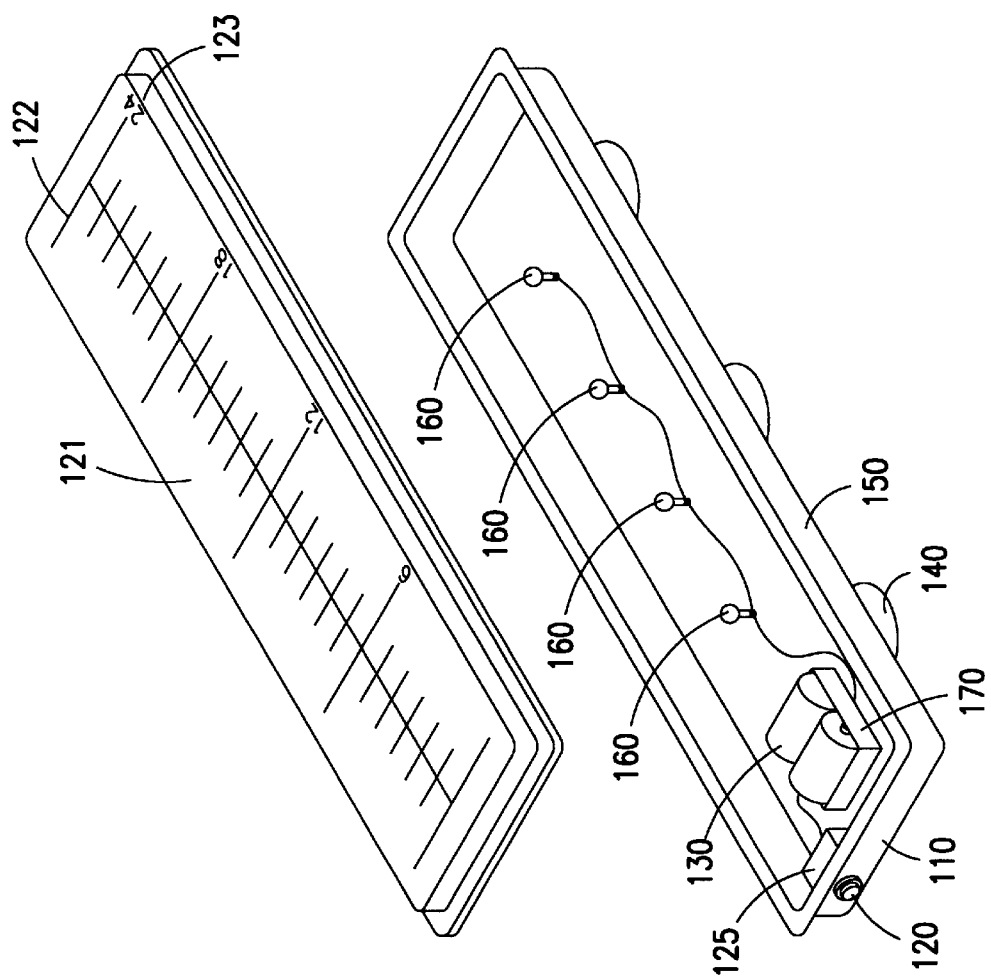
FIG. 4 is a view of a second embodiment of a fish board according to the invention.

FIG. 4 shows another embodiment of a fish board according to the invention. Housing 150, made from plastic or metal, has a plurality of standard incandescent flashlight bulbs 160 attached within. Standard flashlight bulbs have a low cost and are readily available. A switch 120 is attached to the wall of housing 150. A timer device 125 is connected between switch 120 and a power source 130. Timer device 125 switches power source 130 off automatically if the user has not manually switched it off within a certain amount of time. This saves battery power when the user forgets to turn the lights off or when the apparatus is bumped and is turned on inadvertently. Switch 120 is electrically connected to power source 130, which is any set of batteries capable of providing power to light source 90, such as two D size batteries. Power source 130 is electrically connected to light bulbs 160. When the user activates switch 120, power source 130 delivers power to light bulbs 160. A holder 170 is attached to the inside of housing 150 for holding the batteries.

FIG. 4 also shows a view of a platform 121. Platform 121 is made from any non-opaque material, such as a thin, milky plastic. Such a plastic diffuses the light to provide better illumination, and it keeps the light from shining in the user's eyes. However, those skilled in the art will recognize that platform 121 could also be partly transparent, especially if the bulbs are situated so that they do not directly shine onto the user.

A length measuring scale 122, is etched or engraved onto platform 121. This provides protection against wearing off, and it is also easy to see and use. Measuring scale 122 also includes indicia 123, which allow the user to make accurate measurements. Platform 121 is attached to housing 150 by a snap-fit attachment. This permits easy access to the batteries and lightbulbs, yet gives a tight, secure fit. When the light from lightbulbs 160 passes through platform 121, the user is able, in low light conditions, to measure the fish or fillet it. Also, because the lights are attached within housing 150, they are not exposed to adverse environmental conditions, but are protected from being damaged.

Those skilled in the art will appreciate that the details described in the exemplary embodiments described above could be combined to provide different embodiments than those described. For example, one could combine a non-opaque platform, a clip, and a pivoting handle. The embodiments may be combined or other embodiments may be utilized and structural changes may be made without departing from the spirit and scope of the present invention. The description is, therefore, not to be taken in a limiting sense, and the scope of the present invention is defined by the appended claims and their equivalents.

What is claimed is:

1. A fish measuring apparatus, comprising:
    a platform for holding a fish;
    a length measuring scale attached to the platform;
    a handle hingedly attached to an end of the platform; and
    a light source attached to the handle;
    wherein the handle is rotatable relative to the platform such that the handle can rotate from a first, carrying position wherein the handle is substantially co-planar relative to the platform, to a second, illuminating position, wherein the light source illuminates the measuring scale when the handle is rotated into the second position.

2. The fish measuring apparatus according to claim 1, further comprising:
    a gripper attached to the platform for holding the fish.

3. The fish measuring apparatus according to claim 1, further comprising:
    a plurality of holders attached to the platform for removably mounting the apparatus to an external surface.

4. A method for measuring a fish, comprising:
    placing the fish on an apparatus comprising:
        a platform for holding the fish;
        a length measuring scale attached to the platform;
        a handle rotatably coupled to the platform; and
        a light source attached to the handle;
    activating the light source if necessary;
    rotating the handle so the light source illuminates the measuring scale; and
    reading the length of the fish off of the length measuring scale.

5. A fish measuring apparatus comprising:
    an elongated platform adapted for holding a fish, wherein the elongated platform includes a pair of sections which are hingedly connected to each other;
    a length measuring scale attached to the platform;
    a handle hingedly connected to an end of the platform; and
    a light source attached to the handle, wherein the handle is rotatable relative to the platform such that the handle can rotate from a first, carrying position wherein the handle is substantially co-planar relative to the platform, to a second, illuminating position wherein the light source illuminates the measuring scale.

6. The fish measuring apparatus of claim 5, further comprising a gripper attached to the platform for holding a fish.

7. The fish measuring apparatus of claim 5, further comprising a plurality of holders attached to the platform for removably mounting the apparatus to an external surface.

8. The fish measuring apparatus of claim 5, wherein the second position has an approximately 90 degrees angle relative to the platform.

9. The fish measuring apparatus of claim 5, further including a power source attached to the handle for powering the light source.

10. The fish measuring apparatus of claim 5, wherein the light source is an elongated light oriented to be substantially perpendicular relative to a longitudinal axis of the elongated platform.

11. The fish measuring apparatus of claim 5, wherein the pair of sections are approximately equal in length such that the elongated platform folds substantially in half when it is folded.

12. The fish measuring apparatus of claim 5, wherein the handle is attached to the elongated platform such that the light source is exposed and illuminatable when the pair of sections are folded together.

* * * * *